(12) United States Patent
Bowe (10) Patent No.: US 8,955,866 B2
(45) Date of Patent: Feb. 17, 2015

(54) REMOVABLE BALL HITCH

(71) Applicant: Curt Manufacturing, LLC, Eau Claire, WI (US)

(72) Inventor: Curtis M. Bowe, Chippewa Falls, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 13/926,476

(22) Filed: Jun. 25, 2013

(65) Prior Publication Data

US 2014/0375020 A1    Dec. 25, 2014

(51) Int. Cl.
*B60D 1/06* (2006.01)
*B60D 1/52* (2006.01)

(52) U.S. Cl.
CPC .. *B60D 1/065* (2013.01); *B60D 1/52* (2013.01)
USPC ...................... 280/511; 280/491.1; 403/322.2

(58) Field of Classification Search
CPC ............. B60D 1/06; B60D 1/52; B60D 1/065
USPC ............ 280/511, 491.1, 491.5, 901; 411/348; 403/322.2, 325, 326
See application file for complete search history.

(56) References Cited

U.S. PATENT DOCUMENTS

| | | | |
|---|---|---|---|
| 2,901,804 A * | 9/1959 | Williams | 411/348 |
| 2,968,205 A * | 1/1961 | Springate | 411/348 |
| 3,046,827 A * | 7/1962 | Myers | 411/348 |
| 4,201,400 A | 5/1980 | Hoogenbosch | |
| 4,522,421 A | 6/1985 | Vance | |
| 4,596,406 A | 6/1986 | Van Vleet et al. | |
| 5,741,022 A | 4/1998 | Wass et al. | |
| 6,616,168 B2 | 9/2003 | Belinky | |
| 6,837,511 B1 | 1/2005 | Johnson, III | |
| 6,883,822 B1 * | 4/2005 | Smith | 280/511 |
| 6,893,184 B2 * | 5/2005 | Mills et al. | 403/322.2 |
| 8,011,685 B2 | 9/2011 | Belinky et al. | |
| 2005/0104326 A1 | 5/2005 | Hord et al. | |
| 2013/0127137 A1* | 5/2013 | McCoy et al. | 280/511 |

\* cited by examiner

*Primary Examiner* — Anne Marie Boehler
(74) *Attorney, Agent, or Firm* — Shewchuk IP Services, LLC; Jeffrey D. Shewchuk (57) ABSTRACT

A ball hitch has an actuator substantially disposed in a towing ball member. The actuator includes a pivotable handle, which in the stowed position forms part of the outer profile of the ball, but which can be pivoted upward to be used to rotate a shaft portion of the actuator. As the shaft rotates, it rotates a paddle with a cam surface housed in a support base for the ball hitch, which pushes on two interference balls. In the stowed position, the cam surface maintains the interference balls projecting outward from openings in the support base to secure the ball hitch into the towing vehicle. When the actuator turns the shaft, the cam surface allows the balls to retract into the support base without changing elevation of the shaft and cam surface.

15 Claims, 7 Drawing Sheets

FIG. 6

REMOVABLE BALL HITCH

CROSS-REFERENCE TO RELATED APPLICATION(S)

None.

FIELD OF THE INVENTION

The present invention relates to towing arrangements, and particularly to ball hitches which are readily removable from the towing vehicle when not in use.

BACKGROUND OF THE INVENTION

For nearly as long as there have been wheeled vehicles, there have been hitch structures to enable one vehicle to pull a trailer or other similar towed load. While such hitch structures have been tried in many shapes, the most popular shape is a ball hitch, wherein the towing force is transferred from the towing vehicle to the towed load using the exterior surface of a generally spherical ball. A coupler on the towed load has a hollow cup shape that fits over and engages the ball. By using a ball hitch, the towed load can be pulled at a wide range of angles and elevations relative to the towing vehicle, for towing over undulating and curving roads and travel paths.

With ball hitches being very popular types of hitches, numerous different arrangements have been designed to enable quick interchanging of the hitch ball. In many instances, the sole purpose of interchangeability is to allow a quick change from a ball of one diameter to a ball of a second, different diameter. Such interchangeable ball hitches may have a post secured to the towing vehicle, with the post configured to engage any of several different diameter balls. In other cases, a separate purpose of interchangeability is to enable substantially complete removeability of the ball hitch from the towing vehicle, so non-towing use of the vehicle is not obstructed by the ball hitch. For either or both purposes, the interchangeable hitch ball should be rugged and securely attachable so as to minimize or eliminate the possibility of unintended disengagement of the ball.

One example of an interchangeable hitch ball is provided in U.S. Pat. No. 4,201,400 to Hoogenbosch. The Hoogenbosch ball hitch sits on a shank, and includes a plunger which is movable up and down within the hitch ball. In the towing position, an enlarged portion of the plunger pushes two balls out of a transverse bore in the shank. When the user wants to remove the hitch ball, the user depresses the plunger so the enlarged portion is no longer in contact with the balls, so the balls can retreat into the shank and the shank can be removed from its collar on the towed vehicle. While the Hoogenbosch device permits a quick and easy removal of the hitch ball, depressing of the plunger to accomplish removal creates its own potential problems. Namely, there is a possibility that the plunger could depress during use of the hitch, such as by debris left in the hitch cup of the coupler. Better solutions which avoid such failure possibilities are needed.

The interchangeable hitches disclosed in Belinky and Belinky et al., U.S. Pat. Nos. 6,616,168 and 8,011,685, borrow from the concept of Hoogenbosch, but move the plunger in the opposite direction. Namely, in the Belinky designs the plunger is moved upward rather than depressed. In the Belinky '168 patent case, the plunger is threaded into the hitch ball. In the Belinky '685 patent case, the plunger is pulled upward against a spring. Because removal of the hitch ball requires the plunger to be moved upward above the profile of the spherical ball, the hitch ball is prevented from inadvertent disengagement whenever the coupler is over the hitch ball. However, the Belinky designs are cumbersome to engage and disengage into the sleeve. In the Belinky '168 patent case, the plunger must be rotated numerous revolutions using a tool such as an Allen wrench to sufficiently move the plunger upward or downward for disengagement or engagement. In the Belinky '685 patent case, no tools are required, but the plunger must be held upward against the spring force for the balls to retract. Holding the plunger upward is difficult to do while dropping the hitch ball into the sleeve.

Hord et al., U.S. Pat. Pub. No. 2005/0104326 operates much like Belinky '685, but the plunger operates two cam members rather than two balls. In the Hord case, the spring pushes the plunger upward, so it always disengages whenever the coupler is not present. This in turn gives the user no way to test and ensure that the hitch ball is secured prior to having the coupler in place.

While Hoogenbosch, Belinky, Belinky et al. and Hord et al. have all come up with forms of solutions that enable the hitch ball to be fully removed from an underlying sleeve, more improvements are possible and needed.

BRIEF SUMMARY OF THE INVENTION

The present invention is a ball hitch having an actuator substantially disposed in a towing ball member. In one aspect, the actuator includes a pivotable handle, which in the stowed position forms part of the outer profile of the ball, and which cannot be moved during towing due to the presence of the cup of the towed vehicle over the ball and due to the recess in which the handle is stowed. When not towing, the handle can be pivoted upward out of its handle recess, and then can be used to move one or more interference projections from the engaged position to a retracted, disengaged position. In another aspect, the actuator includes a shaft extending vertically through the ball and down to a support base, and actuation does not involve any change in elevation of the actuator. In a third aspect, the shaft attaches to a paddle having a cam surface, with the cam surface pushing interference projection balls out into the engaged position. The preferred ball hitch of the present invention avoids the problems of the prior art, can be easily engaged and disengaged without any tools, and still prevents any possibility of inadvertent or accidental disengagement during towing.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

The preferred removable ball hitch 10 of the present invention includes a towing ball portion 12 supported above a neck 14. The neck 14 flares outward in a curved cone-like way to a stand 16. The towing ball 12, neck 14 and stand 16 generally have an overall look and size as common in the towing industry. For instance, in the embodiment shown, the ball 12 defines a generally spherical profile of about 2.3 inches in diameter, with the neck 14 having a narrowest diameter of about 1.25 inches, flaring out to a stand 16 of about 3 inches in diameter. The center of the ball 12 is about 3 inches above the bottom of the stand 16. By having such a look and size, the removable ball hitch 10 will mate with many towing arrangements already on the market which are intended to be towed from a ball hitch, and consumers are already generally aware of how to attach a trailer (cup 18 shown in FIG. 3) to the ball hitch 10.

The stand 16 and neck 14 extend above a support base 20. In the preferred embodiment, the base 20 is cylindrical, although the base 20 could equally have a different shape depending upon the sleeve 22 (shown in FIGS. 3 and 6) for which it is intended for use, such as being square, rectangular, or hexagonal. In the preferred embodiment, the base 20 is about 2.75 inches tall and has a diameter of about 2.25 inches. By being cylindrical, and depending upon the sleeve configuration, it is possible that the entire ball hitch 10 can rotate within the sleeve 22 during towing use of the ball hitch 10. In the preferred construction method, the ball 12, neck 14, stand 16 and base 20 are all formed out of a single monolithic piece of metal 24, such as machine forged from SAE 5140 alloy steel. Alternatively, these components 12, 14, 16, 20 could be separately formed and welded or otherwise joined together to form the ball hitch member 24. The ball hitch member 24 is preferably chrome plated for a pleasing appearance and corrosion resistance.

Figure 1:
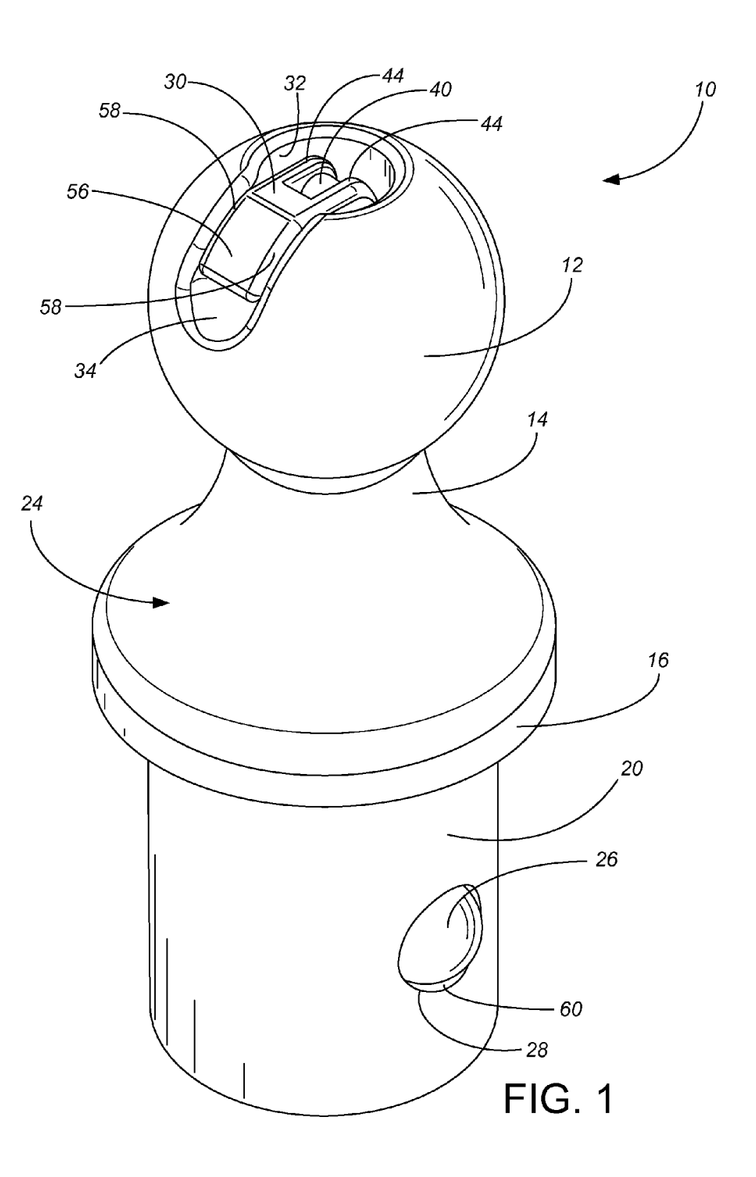
FIG. 1 is a perspective view from above showing a preferred embodiment of a ball hitch in accordance with the present invention and in the engaged position.
Figure 2:
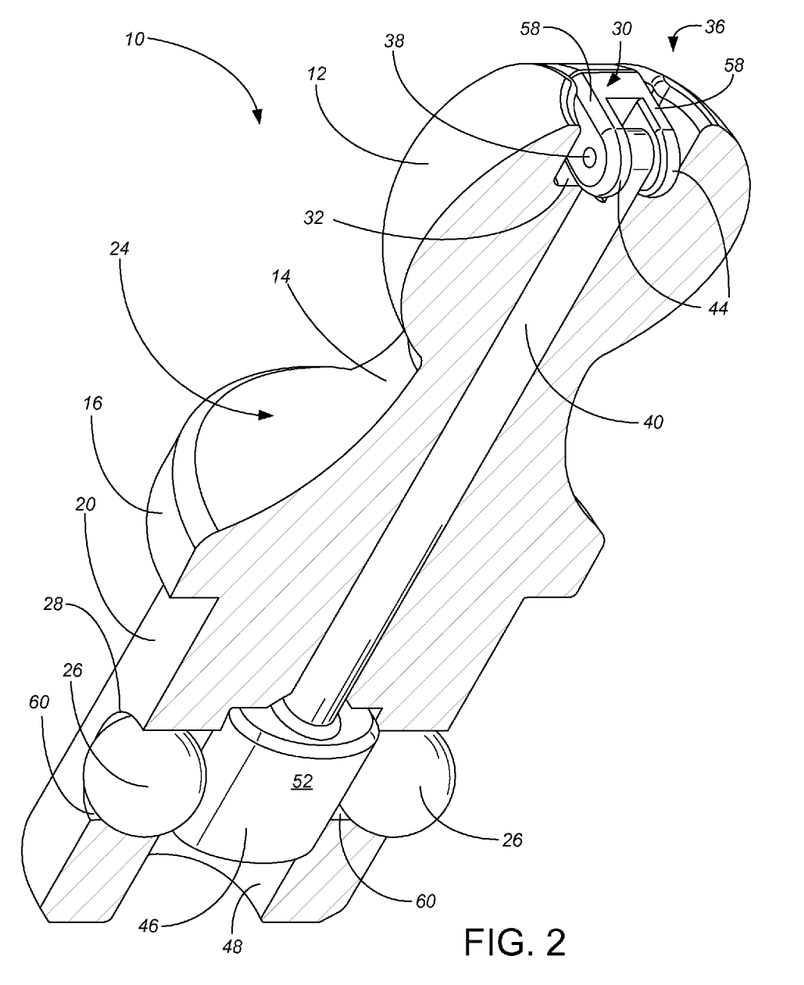
FIG. 2 is a perspective view in partial cross-section showing the interior of the ball hitch of FIG. 1.
Figure 3:
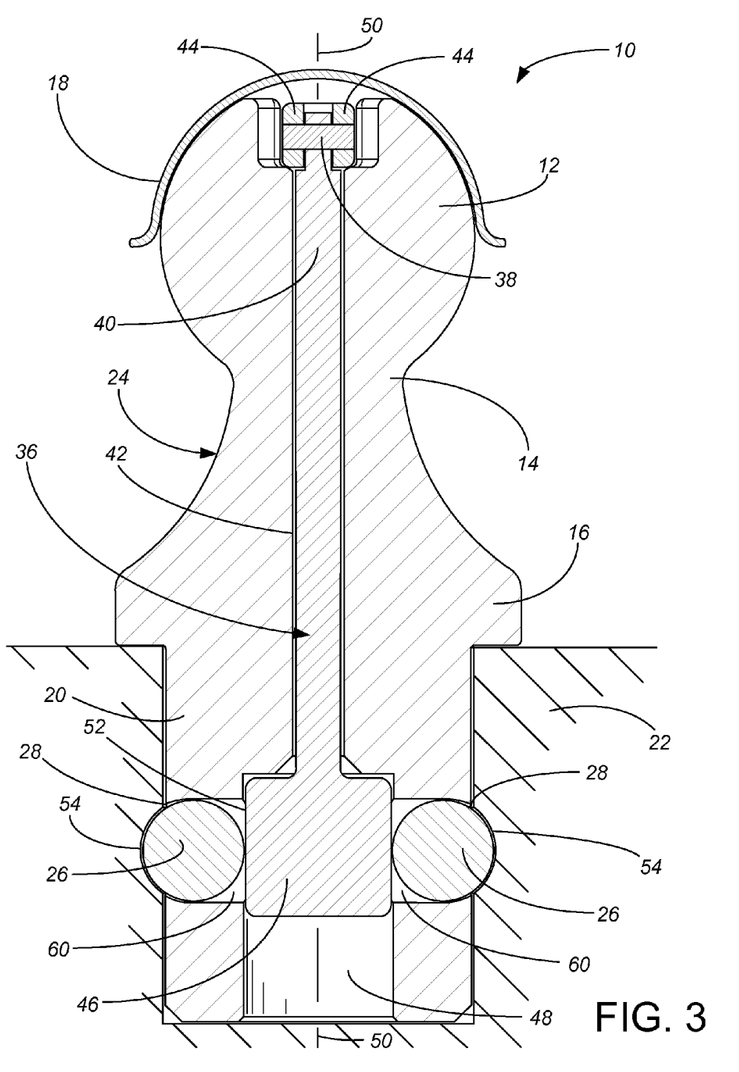
FIG. 3 is a cross-sectional view showing the ball hitch of FIGS. 1 and 2 engaged in a receiving sleeve of a towing vehicle.
Figure 4:
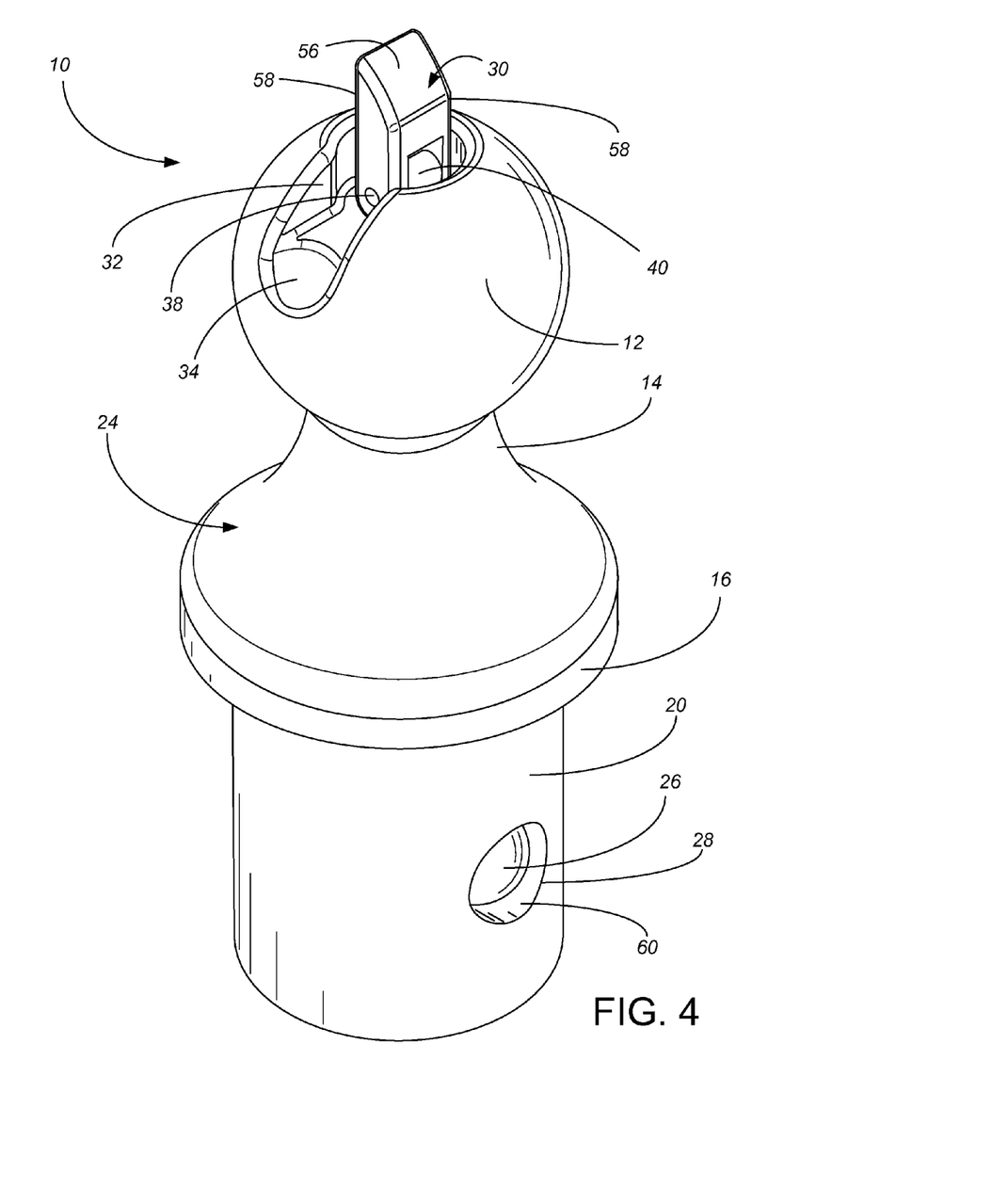
FIG. 4 is a perspective view from above showing the ball hitch of FIGS. 1-3 in the disengaged position.
Figure 5:
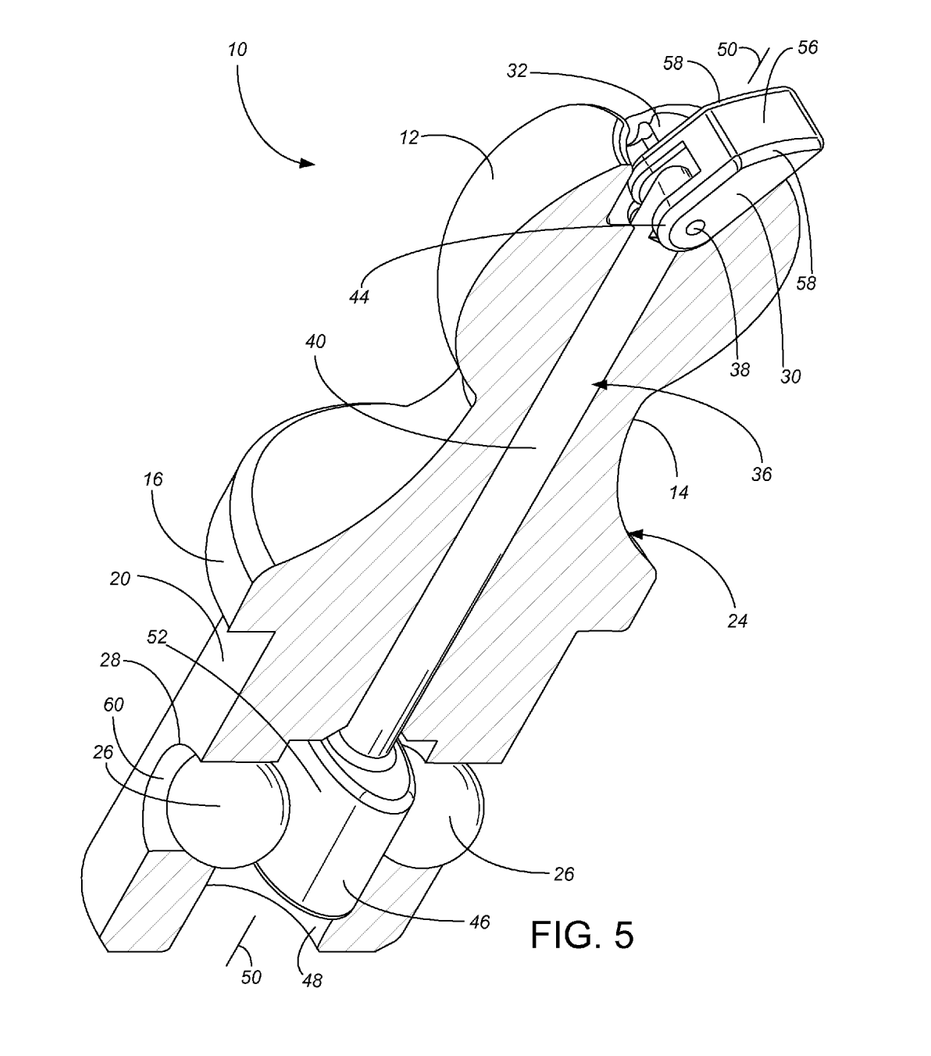
FIG. 5 is a perspective view in partial cross-section showing the interior of the ball hitch of FIG. 4.

Two interference projections 26 extend out of opposing openings 28 on either side of the base 20. While one or three or more interference projections could be used extending out of projection openings on the exterior surface of the base 20, using two interference projections 26 helps to balance equal and opposite forces on the ball hitch 10. In the preferred embodiment, the interference projections are spherical balls 26 of about 0.75 inches in diameter. Alternatively, the interference projections could be cylindrical or bullet shaped, or could even be block shaped. However, using spherical balls 26 for the interference projections simplifies construction and assembly. The openings 28 for the interference balls 26 are slightly crimped or otherwise narrowed to an end size slightly smaller than the ball diameter to constrain the balls 26 within the base 20, but so the interference balls 26 can project a significant distance outside the base 20. For instance, in the preferred embodiment and as shown in FIGS. 1-3, the interference balls 26 can extend about 0.2 inches beyond the cylindrical profile of the base 20. The elevation of the interference balls 26 along the height of the base 20 can be selected as desired so long as it matches the profile of the receiving sleeve 22 (shown in FIGS. 3 and 6). In the preferred embodiment, the interference balls 26 are centered at an elevation which is about 1.5 inches below the bottom of the stand 16 and about 1.25 inches above the bottom of the base 20.

A handle 30 is shown in a handle recess 32 in the top of the towing ball 12, but still leaving the handle 30 accessible on the exterior surface of the towing ball 12 when not in towing use. In the engaged position shown in FIGS. 1-3, the handle 30 fully fits within the spherical profile defined by the towing ball 12. While the handle 30 could be formed out of two or more links, the preferred handle 30 is a single link pivotable about a horizontal axis, with the handle 30 extending generally horizontal when in the engaged position. A finger recess portion 34 at the bottom of the handle 30 allows the user to get a finger underneath the handle 30 to finger pivot the handle 30 upward to a generally vertical operative position. For instance, in the preferred embodiment, the finger recess portion 34 is about 0.56 inches wide and about 0.28 inches high to receive the user's finger beneath the handle 30 in the engaged position.

As best shown in FIGS. 2, 3, 5 and 6, the handle 30 is a portion of an actuator 36 for the interference balls 26. A pivot pin 38 attaches the handle 30 to a shaft portion 40 of the actuator 36, with the shaft 40 running in a shaft bore 42 vertically down the center of the ball 12 and through the neck 14 and stand 16 into the base 20. In the preferred embodiment, the pivot pin 38 extends through two ears 44 in the handle 30 and through a pivot pin opening in the top end of the shaft 40, but many other pivotal couplings would also be suitable. In the preferred embodiment, the majority of the length of the shaft 40 (except where attaching to the pivot pin 38 and handle 30) and the entire length of the shaft bore 42 are cylindrical.

A paddle portion 46 is fixed to the shaft 40 at an elevation coinciding with the elevation of the interference balls 26. In the preferred embodiment, the paddle 46 resides within a cylindrical paddle bore/chamber 48. The shaft 40 and the paddle 46 can both rotate about a vertical axis 50 within their respective bores 42, 48, without changing elevation. If desired, an end cap or plug (not shown) can be used to conceal the paddle 46 within the paddle bore 48. In the preferred embodiment, the bottom of the paddle bore 48 is left open, which is beneficial in removing any rainwater than might enter the ball hitch 10.

The paddle 46 includes an outer cam surface 52 which is not cylindrical. Rather, the cam surface 52 has a varying radial distance from the rotational axis 50 based upon circumferential position of the actuator 36. In the preferred embodiment, the paddle 46 is oval in horizontal cross section, and more particularly is elliptical in horizontal cross section, with a major axis of about 1.1 inches (major radius of about 0.55 inches) and a minor axis of about 0.6 inches (minor radius of about 0.3 inches). The difference between the major radius and the minor radius represents the travel of each of the interference balls 26 from the engaged position to the disengaged position, and vice versa. Alternatively, the cam surface 52 can have an engineered profile to control the translation between rate of rotation of the shaft 40 and rate of movement of the interference balls 26 as a function of circumferential position.

When the handle 30 is in the stowed position, the entire actuator 36 is disposed substantially within the towing ball member 24. This both allows the towing ball 12 to be accessible for use, and also protects the working parts of the actuator 36 from wear and tear, bending, corrosive elements, etc. Because the shaft 40 is protected, it can be made smaller in horizontal cross-section than the paddle 46, with the shaft bore 42 being smaller in horizontal cross-section than the paddle chamber 48. Having a smaller shaft bore 42 allows the ball hitch 10 to be stronger, particularly at the neck 14. However, depending upon the size of the neck and the size of the paddle and when using a larger diameter shaft, the paddle could alternatively be formed by machining material away from a cylindrical shaft.

The preferred ball hitch 10 is used with an appropriately shaped support sleeve 22 (shown in FIGS. 3 and 6) positioned in the towing vehicle to receive the support base 20. The support sleeve 22 has a recess 54 positioned at an elevation to receive the interference projection. If rotation of the ball hitch 10 is desired to be permitted during towing, the recess 54 can be circular or doughnut shaped in the support sleeve 22. If a particular stationary circumferential position of the ball hitch 10 is desired, the recess 54 may be located in the support sleeve 22 only in the circumferential position of the interference projections 26.

The simple method of use of the preferred embodiment of the present invention can be readily understood by comparing FIGS. 1-3 to FIGS. 4-6. While the removable ball hitch 10 is in the engaged position of FIGS. 1-3, the major axis of the cam surface 52 of the paddle 46 contacts the interference balls 26, pushing the interference balls 26 outward. The major axis of the paddle 46, added together with the diameters of the interference balls 26 (1.1+0.75+0.75=2.6 inches) is greater than the diameter of the base 20 (2.25 inches), meaning that the interference balls 26 necessarily extend out of the base 20 to be received in an engagement recess 54 of the sleeve 22. The interference balls 26 extend too far outward to enable the ball hitch 10 to be removed from the sleeve 22. As long as the handle 30 remains downward in the stowed position within the handle recess 32, the handle 30 prevents the shaft 40 and the paddle 46 from rotating within the ball hitch 10. As long as the cup 18 of the trailer is over the ball 12, the handle 30 cannot be raised out of the handle recess 32/out of the stowed position. The preferred handle 30 has a curved outer profile 56 which in the engaged position generally matches the profile of the sphere defined by the ball portion 12, which both looks aesthetically pleasing, provides additional towing strength, and conveys to the user that the cup 18 assists in holding the handle 30 in the engaged position while towing.

At the major axis, the cam surface 52 of the paddle 46 is normal to the radial direction, meaning that pushing of the interference balls 26 inward merely tries to compress the paddle 46 with equal and opposite forces, and without any rotational force placed on the actuator 36. The ball hitch 10 is securely and robustly retained within the sleeve 22 and cannot be raised. During towing, only a catastrophic failure of the hitch ball 12, paddle 46, interference balls 26 or sleeve 22 can allow removal of the ball hitch 10 from the sleeve 22. As long as each of the hitch ball 12, paddle 46, interference balls 26 and sleeve 22 are formed of strong, quality steel as described herein, they can readily withstand the rated towing forces without any possibility of accidental disengagement during towing.

After towing is completed and the cup 18 is removed from the ball 12, the handle 30 can be easily raised from the stowed position to an operative position by placing a finger into the finger recess portion 34 and lifting the handle 30 so it pivots upward beyond the spherical profile of the ball 12. The handle 30 portion is required to move outside the stow recess and be at least partially outside the sphere defined by the ball portion 12 in order to move the interference projections 26 out of the engaged position. This moving of the handle 30 to the operative position preferably occurs without substantial movement of the shaft 40. Alternatively, the ears 44 of the handle 30 can act as cams which bias the shaft 40 upward in either the stowed position, the operative position or both. However, the preferred embodiment places no latent tension force on the shaft 40 in either the stowed position or the operative position.

Once sufficiently raised to the operative position, the handle 30 can be used to rotate the actuator 36 about the vertical axis 50 of the ball hitch 10, i.e., about the axis 50 of the shaft 40. In the preferred embodiment with an elliptical paddle 46, a 90° rotation of the handle 30 places the actuator 36 into the disengaged position shown in FIGS. 4-6. Alternatively, a different amount of rotation can be used depending upon the shape of the paddle. For instance, the paddle may be shaped such that its smallest portion is 160° away from its widest portion, or such that its smallest portion is 340° away from its widest portion (with the interference projections 26 at different elevations on and using different portions of the cam surface 52). However, the elliptical shape of the preferred paddle 46 is simple to construct and equally allows removal by movement of the handle 30 in either a clockwise or counterclockwise direction. While the handle 30 could be cylindrical or have a knurled surface to assist in rotation, the preferred handle shape has corner edges 58 to assist in gripping the handle portion 30 when in the generally vertical orientation.

Figure 6:
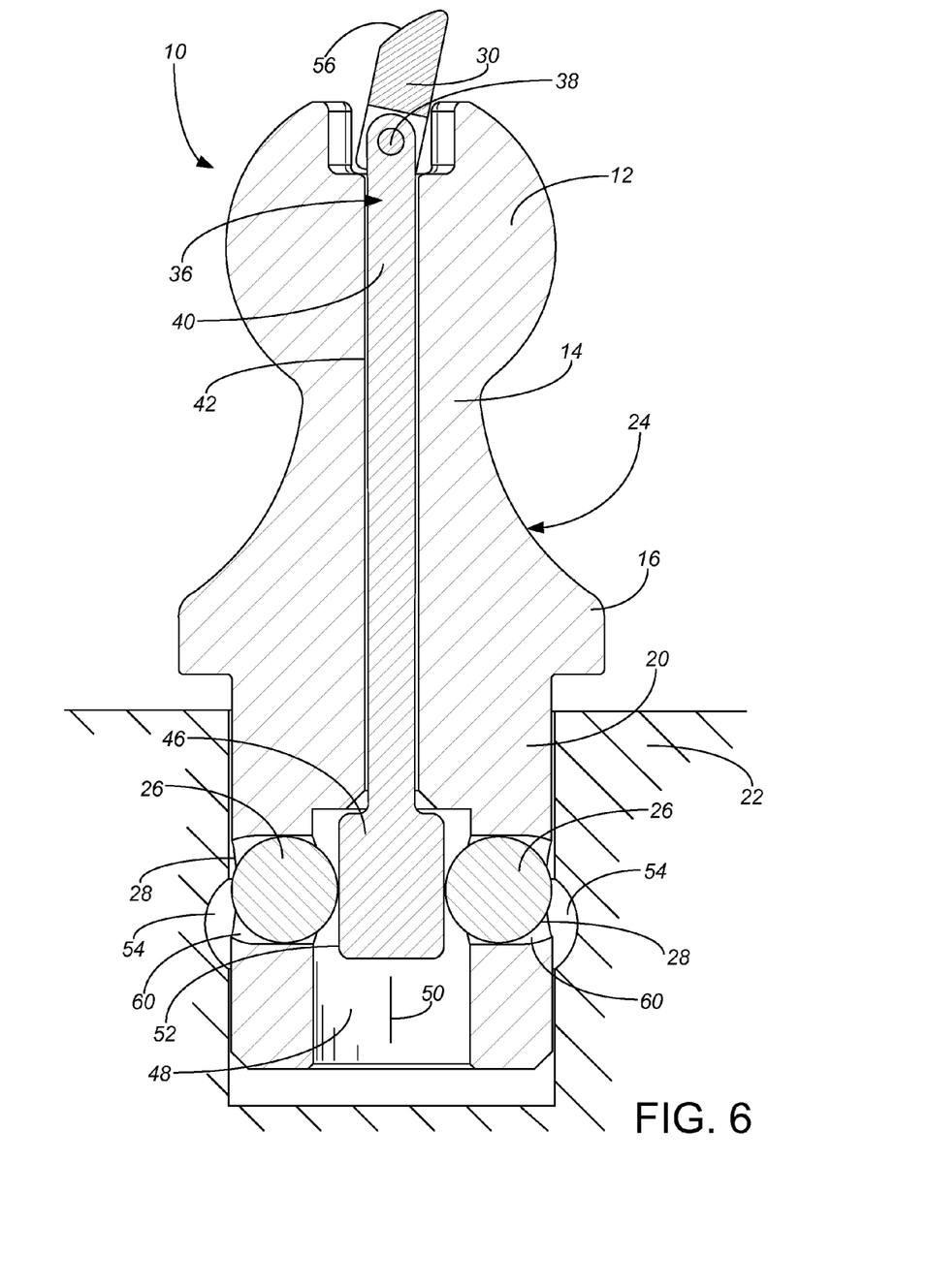
FIG. 6 is a cross-sectional view showing the ball hitch of FIGS. 1-5 disengaged and being inserted or removed from the receiving sleeve of the towing vehicle.
Figure 7:
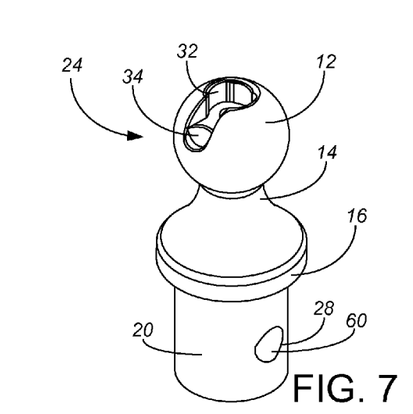
FIG. 7 is a perspective view from above showing the hitch ball used in the ball hitch of FIGS. 1-6.
Figure 8:
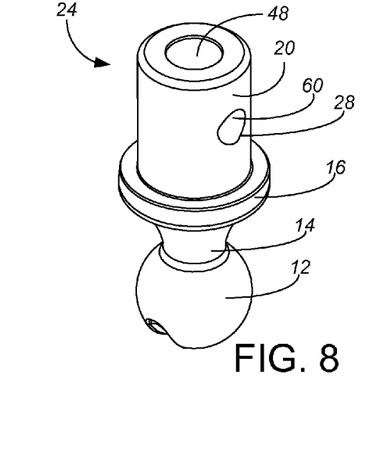
FIG. 8 is a perspective view from below showing the hitch ball used in the ball hitch of FIGS. 1-6.
Figure 9:
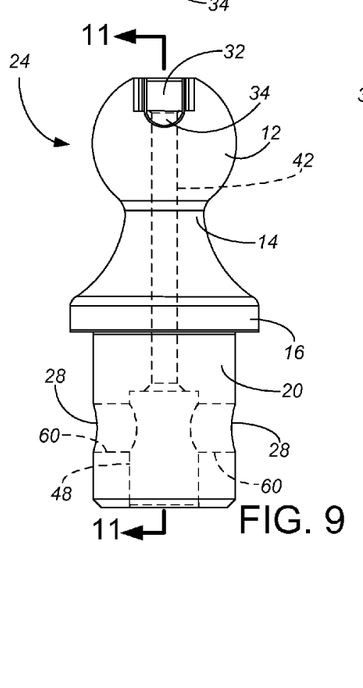
FIG. 9 is a side view of the hitch ball of FIGS. 7 and 8.
Figure 10:
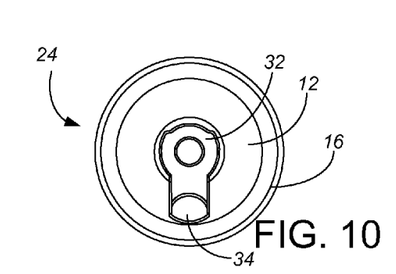
FIG. 10 is a plan view of the hitch ball of FIGS. 7-9.
Figure 11:
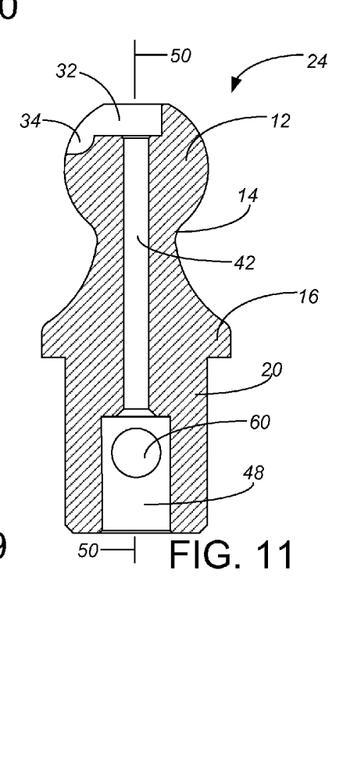
FIG. 11 is a cross-sectional view of the hitch ball of FIGS. 7-10 taken along lines 11-11.

In the disengaged position, the minor axis of the cam surface 52 of the paddle 46 is in place to contact the interference balls 26. The minor axis of the paddle 46, added together with the diameters of the interference balls 26 (0.6+0.75+ 0.75=2.1 inches) is smaller than the diameter of the base 20 (2.25 inches), meaning that the interference balls 26 can readily retreat fully into the exterior shape or profile of the base 20. Pulling upward on the ball hitch 10 causes the sleeve 22 to push the interference balls 26 inward so the removable ball hitch 10 can be easily removed from the sleeve 22 as shown in FIG. 6.

To return the ball hitch 10 to the engaged position, first the ball hitch 10, with the handle 30 in the disengaged position, is dropped into the sleeve 22. The handle 30 is then moved in the opposite order, first rotating the actuator 36 and then lowering the handle 30 into the handle recess 32. The rotational movement of the actuator 36 pushes the interference projections 26 into the engaged position. The handle 30 cannot be lowered into the stowed position unless the paddle 46 first pushes the balls 26 outward into the recess 54. For instance, if there is dirt or other obstruction preventing the ball hitch 10 from fully seating in the sleeve 22, then the handle 30 will not be fully rotatable back to the orientation where the handle 30 matches up to be lowered into the handle recess 32. It is rotation rather than lowering of the handle 30 that causes the interference projections 26 to move outward; lowering of the handle 30 is only possible once sufficient rotation and securing of the ball hitch 10 has been achieved.

Manufacture and assembly of the ball hitch 10 is simple and straightforward. The hitch ball 12 is forged, and the shaft bore 42, paddle bore 48 and bores 60 for the interference balls 26 are machined or otherwise formed into the hitch ball 12. Any crimping or other closing of the ends of the bores 60 for the interference balls 26 is performed. The interference balls 26 are inserted, and then shaft 40 and paddle 46 are inserted into their respective bores 42, 48 from below. The handle 30 is attached to the top of the shaft 40 from above, inserting the pivot pin 38 sideways into both the ears 44 and the shaft opening, which is easily performed while the handle 30 and shaft 40 are in the disengaged orientation. Alternatively if the paddle 46 is small enough to fit within the shaft bore 42, the handle 30 can be attached to the shaft 40 before lowering the handle/shaft/paddle into the shaft bore 42 from above, but then some other mechanism should be used (as a final step of assembly) to prevent the shaft/paddle from being pulled upward out of the shaft bore 42.

It is noted that there are many alternative linkages that could be used to couple the interference projection(s) to the shaft such that the interference projection(s) move outward when the shaft is rotated without changing the elevation of the shaft. However, having interference balls 26 riding on the cam surface 52 of the paddle 46 without a linked attachment works very well and simplifies the machining and assembly operations.

It can be seen that the preferred embodiment of the present invention avoids all of the deficiencies of the noted prior art. There is no possibility that the ball hitch 10 could disengage during towing use of the hitch. The ball hitch 10 is easy to engage and disengage into the sleeve 22, with only a raising/lowering and 90° turn of the handle 30 and without any tools, and with the handle 30 holding itself in position while dropping the ball hitch 10 into the sleeve 22. The user can readily test and have confidence that the ball hitch 10 is secured prior to placing the cup 18 over the hitch ball 12.

Although the present invention has been described with reference to preferred embodiments, workers skilled in the art will recognize that changes may be made in form and detail without departing from the spirit and scope of the invention.

What is claimed is:

1. A ball hitch for using in towing from a towing vehicle, the ball hitch comprising:
    a towing ball member comprising:
        a support base, the support base having an exterior shape with at least one projection opening on an exterior surface;
        a neck connected to the support base;
        a ball portion connected to the neck and having a generally spherical shape, with a shaft opening extending through the ball and neck and into the support base;
    an actuator disposed substantially within the towing ball member, the actuator comprising:
        a shaft portion extending through the shaft opening, the shaft portion defining a shaft axis; and
        a handle portion accessible on an exterior surface of the ball portion, the handle portion being coupled to the shaft portion, the handle portion being movable, without substantial movement of the shaft, between a stowed position wherein the handle resides entirely within the generally spherical shape of the ball portion and an operative position wherein the handle extends outside the generally spherical shape so the handle can be subsequently used to move the shaft portion; and
    an interference projection disposed substantially within the support base and moveable between an engaged position wherein the interference projects outside the exterior shape of the support base through the projection opening and a disengaged position wherein the interference projection is fully within the exterior shape of the support base, wherein movement of the actuator pushes the interference projection into the engaged position.

2. The ball hitch of claim 1, wherein the handle portion is pivotally attached to the shaft portion.

3. The ball hitch of claim 2, wherein the ball comprises a stow recess for the handle portion which receives the handle portion in the engaged position such that the handle portion in the engaged position is fully within a sphere defined by the ball portion, and wherein the handle portion is required to move outside the stow recess and be at least partially outside the sphere defined by the ball portion in order to move the interference projection into the disengaged position.

4. The ball hitch of claim 3, wherein the handle portion is pivotally attached to the shaft portion for pivoting about a generally horizontal pivot axis relative to the generally vertical rotational axis of the shaft portion.

5. The ball hitch of claim 4, wherein the handle portion is generally horizontal when in the engaged position, and pivots to a generally vertical orientation for rotating the actuator into the disengaged position.

6. The ball hitch of claim 5, wherein the handle portion includes corners to assist in gripping the handle portion when in the generally vertical orientation.

7. The ball hitch of claim 2, wherein the handle portion comprises a curved outer profile which in the engaged position generally matches the profile of the sphere defined by the ball portion.

8. A ball hitch for using in towing from a towing vehicle, the ball hitch comprising:
    a towing ball member comprising:
        a support base, the support base having an exterior shape with at least one projection opening on an exterior surface;
        a neck connected to the support base;
        a generally spherical ball portion connected to the neck, with a shaft opening extending through the ball and neck and into the support base;
    an actuator disposed substantially within the towing ball member, the actuator comprising:
        a handle portion accessible on an exterior surface of the ball portion;
        a shaft portion connected to the handle portion and extending through the shaft opening, the shaft portion defining a rotational axis about which the actuator can rotate while substantially within the towing ball member; and
        a paddle portion connected to the shaft portion, the paddle portion having a cam surface which has a varying radial distance from the rotational axis based upon circumferential position; and
    an interference projection disposed substantially within the support base and riding on the cam surface so as to be moveable between an engaged position wherein the interference projects outside the exterior shape of the support base through the projection opening and a disengaged position wherein the interference projection is fully within the exterior shape of the support base, wherein rotation of the actuator causes the cam surface to push the interference projection into the engaged position;
    wherein the handle portion is pivotally attached to the shaft portion for pivoting about a generally horizontal pivot axis relative to the generally vertical rotational axis of the shaft portion,
    wherein the ball portion comprises a stow recess for the handle portion which receives the handle portion in the engaged position such that the handle portion in the engaged position is fully within a sphere defined by the ball portion, and
    wherein the handle is required to move outside the stow recess and be at least partially outside the sphere defined by the ball portion in order to move the interference projection into the disengaged position.

9. The ball hitch of claim 8, wherein the handle portion is generally horizontal when in the engaged position, and pivots to a generally vertical orientation for rotating the actuator into the disengaged position, wherein the handle portion includes corners to assist in gripping the handle portion when in the generally vertical orientation, and wherein the handle portion comprises a curved outer profile which in the engaged position generally matches the profile of the sphere defined by the ball portion.

10. The ball hitch of claim 8, wherein the interference projection comprises two spherical balls riding on the cam surface of the paddle portion.

11. The ball hitch of claim 8, wherein the actuator is rotatable without changing elevation of the paddle portion.

12. The ball hitch of claim 8, wherein the cam surface of the paddle portion is oval in horizontal cross-section.

13. The ball hitch of claim 12, wherein the interference projection comprises two spherical balls riding on the cam surface of the paddle portion, and wherein the cam surface of the paddle portion is perpendicular to a direction of travel of the two spherical balls when in the engaged position.

14. The ball hitch of claim 8, further comprising a support sleeve shaped to receive the support base, the support sleeve having a recess positioned at an elevation to receive the interference projection.

15. The ball hitch of claim 14, wherein the support base and the support sleeve are both cylindrical, and wherein the recess in the support sleeve permits rotation of the support base within the support sleeve while the interference projection is in the engaged position.

* * * * *